(12) United States Patent
Sharifi et al.

(10) Patent No.: US 9,870,345 B2
(45) Date of Patent: Jan. 16, 2018

(54) TEXTUAL MESSAGE ORDERING BASED ON MESSAGE CONTENT

(71) Applicant: Google Inc., Mountain View, CA (US)

(72) Inventors: Matthew Sharifi, Kilchberg (CH); Jakob Nicolaus Foerster, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/153,191

(22) Filed: May 12, 2016

(65) Prior Publication Data

US 2017/0329745 A1 Nov. 16, 2017

(51) Int. Cl.
| | |
|---|---|
| *G06F 17/24* | (2006.01) |
| *G06F 17/21* | (2006.01) |
| *H04L 12/58* | (2006.01) |
| *G06F 17/28* | (2006.01) |

(52) U.S. Cl.
CPC .......... *G06F 17/212* (2013.01); *G06F 17/218* (2013.01); *G06F 17/2818* (2013.01); *H04L 51/04* (2013.01)

(58) Field of Classification Search
None
See application file for complete search history.

(56) References Cited

U.S. PATENT DOCUMENTS

| | | |
|---|---|---|
| 8,250,154 B2 | 8/2012 | Limberg |
| 2005/0149621 A1* | 7/2005 | Kirkland ................. H04L 51/16 709/207 |
| 2006/0059235 A1* | 3/2006 | Peterson ................ G06Q 10/00 709/206 |
| 2008/0028027 A1* | 1/2008 | Jachner ................... H04L 51/04 709/206 |
| 2008/0077572 A1* | 3/2008 | Boyle .................. G06F 17/2705 |
| 2008/0263157 A1* | 10/2008 | Bhogal ................ G06Q 10/107 709/206 |
| 2009/0100141 A1* | 4/2009 | Kirkland ................. H04L 51/04 709/206 |

(Continued)

OTHER PUBLICATIONS

PCT International Search Report and Written Opinion dated Feb. 17, 2017 for PCT International Application No. PCT/US2016/067475, 12 pages.

*Primary Examiner* — Asher Kells
(74) *Attorney, Agent, or Firm* — RMCK Law Group, PLC

(57) ABSTRACT

A technique for ordering textual messages in a graphical user interface (GUI) of a communication application based on text content can include receiving a textual message, and determining an insertion point in the GUI based on the text content of the received textual message. In some implementations, determining the insertion point can include utilizing a language model to determine a probability that the text content of the textual message is associated with each preceding textual message. Additionally or alternatively, determining an insertion point can include utilizing a timestamp corresponding to a time that the received textual message was initiated by a sender user. The technique can further include displaying the textual message at the determined insertion point of the GUI. In some implementations, the displaying of the textual message can include providing an active indication of the received textual message being inserted at the determined insertion point.

20 Claims, 11 Drawing Sheets

(56) References Cited

U.S. PATENT DOCUMENTS

| | | |
|---|---|---|
| 2009/0313343 A1 | 12/2009 | Brady et al. |
| 2012/0023113 A1* | 1/2012 | Ferren ............... G06F 17/30867 707/751 |
| 2014/0143684 A1 | 5/2014 | Oh et al. |
| 2016/0021033 A1 | 1/2016 | Peterson et al. |
| 2016/0065519 A1* | 3/2016 | Waltermann ............ H04L 67/10 709/206 |

* cited by examiner

TEXTUAL MESSAGE ORDERING BASED ON MESSAGE CONTENT

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

People are increasingly utilizing electronic devices to communicate with one another through textual (and non-textual) messages. These textual messages may be associated with or transmitted via communication applications, such as an instant messaging application, a social network, a bulletin board or other message posting service/website. In typical communication applications, for example, in an instant messaging application, textual messages are presented to the user in the order in which they are received or sent. Thus, a particular instant message sent by a user may be ordered such that instant messages sent or received at a time previous to the time of the particular instant message are displayed in a preceding position to the particular instant message. Furthermore, additional instant messages sent/received after the time of the particular instant message are displayed in a subsequent position to the particular instant message.

SUMMARY

A technique for ordering textual messages in a graphical user interface (GUI) of a communication application based on text content can include receiving a textual message. The technique can also include determining an insertion point in the GUI based on the text content of the received textual message. In some implementations, determining the insertion point can include utilizing a language model to determine a probability that the text content of the textual message is associated with each preceding textual message. Additionally or alternatively, determining an insertion point can include utilizing a timestamp corresponding to a time that the received textual message was initiated by a sender user. The technique can further include displaying the textual message at the determined insertion point of the GUI. In some implementations, the displaying of the textual message can include providing an active indication of the received textual message being inserted at the determined insertion point.

A computing device for ordering textual messages in a graphical user interface (GUI) of a communication application based on text content is also presented. The computing device can include one or more processors, and a non-transitory computer-readable storage medium having a plurality of instructions stored thereon, which, when executed by the one or more processors, cause the one or more processors to perform operations.

The operations can include receiving a textual message, and determining an insertion point in the GUI based on the text content of the received textual message. In some implementations, determining the insertion point can include utilizing a language model to determine a probability that the text content of the textual message is associated with each preceding textual message. Additionally or alternatively, determining an insertion point can include utilizing a timestamp corresponding to a time that the received textual message was initiated by a sender user. The operations can further include displaying the textual message at the determined insertion point of the GUI. In some implementations, the displaying of the textual message can include providing an active indication of the received textual message being inserted at the determined insertion point.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
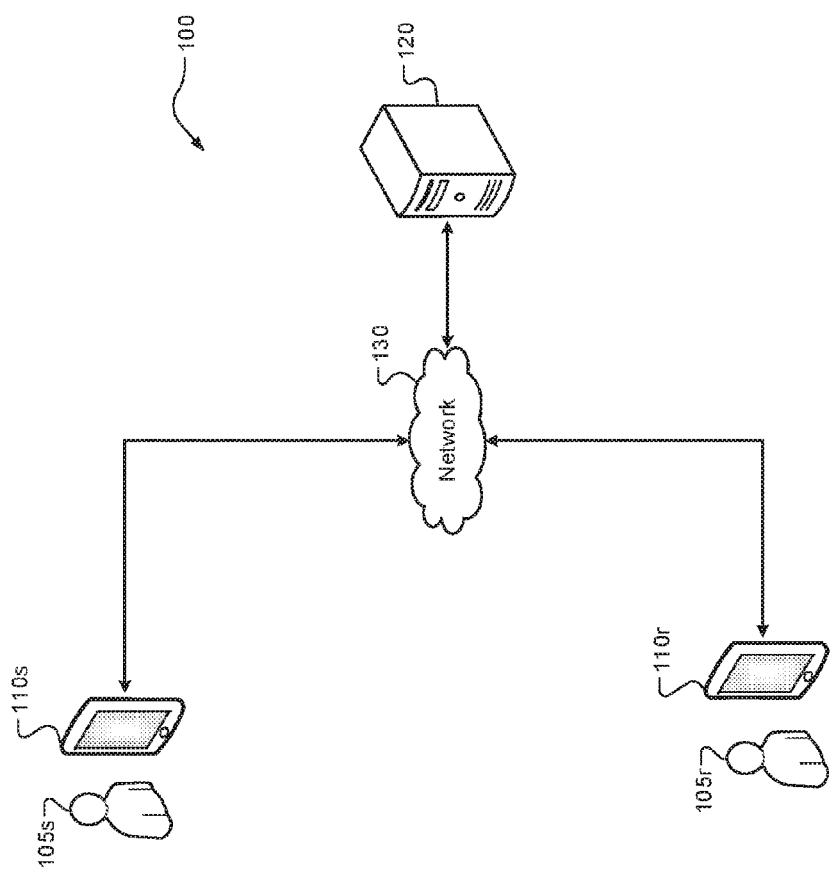
FIG. 1 is a diagram of an example computing system including an example computing device and an example server and according to some implementations of the present disclosure.

As briefly mentioned above, typical communication applications utilize the time of a textual message (such as, the sent time corresponding to the time that the message was sent or the received time corresponding to the time that the message was received) to order textual messages in a graphical user interface (GUI) of the communication application. While users are familiar with this ordering scheme, in certain instances—particularly in situations in which multiple textual messages are sent and received in a short time period—this ordering of messages can lead to ambiguity as to which previous textual message a newly received textual message is referring.

The following example instant messages between a first user and a second user illustrate the potential ambiguity that can occur with the typical message ordering scheme. The first user sends a first instant message stating "I was offered a new job!" at a first time (time t). The second user receives this first instant message, and subsequently begins typing a second instant message "That is terrific!" in response. Before the second user has sent the second instant message, however, the first user sends a third instant message to the second user (at time t+1) that states "I lost my phone on the way home." Then, at time t+2, the second user finishes typing the second instant message ("That is terrific!") and sends it to the first user.

In a typical instant messaging application, the first, second, and third instant messages described above may be displayed in the GUI of the messaging application in the following order:

I was offered a new job!
first instant message from first user at time t

I lost my phone on the way home.
    third instant message from first user at time t+1
        That is terrific!
    second instant message from second user at time t+2
In this example, it may be ambiguous to the first user as to which instant message the second user's instant message "That is terrific!" refers. From the text content of the conversation embodied in the instant messages, however, it is likely that the second instant message ("That is terrific!") refers to the first instant message ("I was offered a new job!") and not the third instant message ("I lost my phone on the way home.") as is implied by the order based merely on the time of the instant messages.

The present disclosure is directed to, inter alia, the technical problem of ordering and displaying textual messages. More specifically, the present disclosure is directed to techniques for displaying instant messages in a GUI of an instant messaging application based on the text content of the instant messages. The text content of a received instant message can be analyzed to determine an insertion point in the GUI, where each insertion point corresponds to a position in the GUI following or subsequent to a preceding instant message. For example only, a language model can be utilized to determine a probability that the text content of the received instant message is associated with each preceding instant message. The insertion point can be based on the probability, by itself or in combination with one or more other factors (discussed below).

In some implementations, the determination of the insertion point can be further based on a time (e.g., embodied in a timestamp) corresponding to each instant message. For example only, if the time difference between the received instant message and a particular preceding instant message is greater than a threshold, the position following the particular preceding instant message may not be considered as a potential insertion point for the received instant message. Alternatively or additionally, the timestamp for an instant message can correspond to the time at which the sender user initiated the instant message (began typing the instant message, last edited the instant message, etc.).

In this manner, the present disclosure may provide one or more benefits, including, but not limited to, a more intuitive and less ambiguous presentation of textual messages in a GUI of a communication application. For ease of description, the techniques of the present disclosure will be described in the context of an instant messaging application that sends and receives instant messages. It should be appreciated, however, that the present disclosure is directed to any type of communication application that is utilized to transmit, post, etc. textual messages, including, but not limited to, an instant messaging application, a social network, a bulletin board or other message posting service/website.

Referring now to FIG. 1, diagram of an example computing system 100 is illustrated. The computing system 100 can be configured to implement an instant messaging communication network amongst a plurality of users via their computing devices. The computing system 100 can include a plurality of example computing devices 110 and an example server 120 that communicate via a network 130 according to some implementations of the present disclosure.

For ease of description, in this application and as shown in FIG. 1, two example computing devices 110 are illustrated and described: a sending computing device 110s that is associated a sender user 105s, and a receiving computing device 110r that is associated with a receiving user 105r. It should be appreciated, however, that each of the computing devices 110s and 110r can both send and receive instant messages and, thus, can be described as the "sending" computing device or the "receiving" computing device (and, similarly, the "sending" user or the "receiving" user) depending on the circumstances and the particular instant message that is being discussed.

Figure 2:
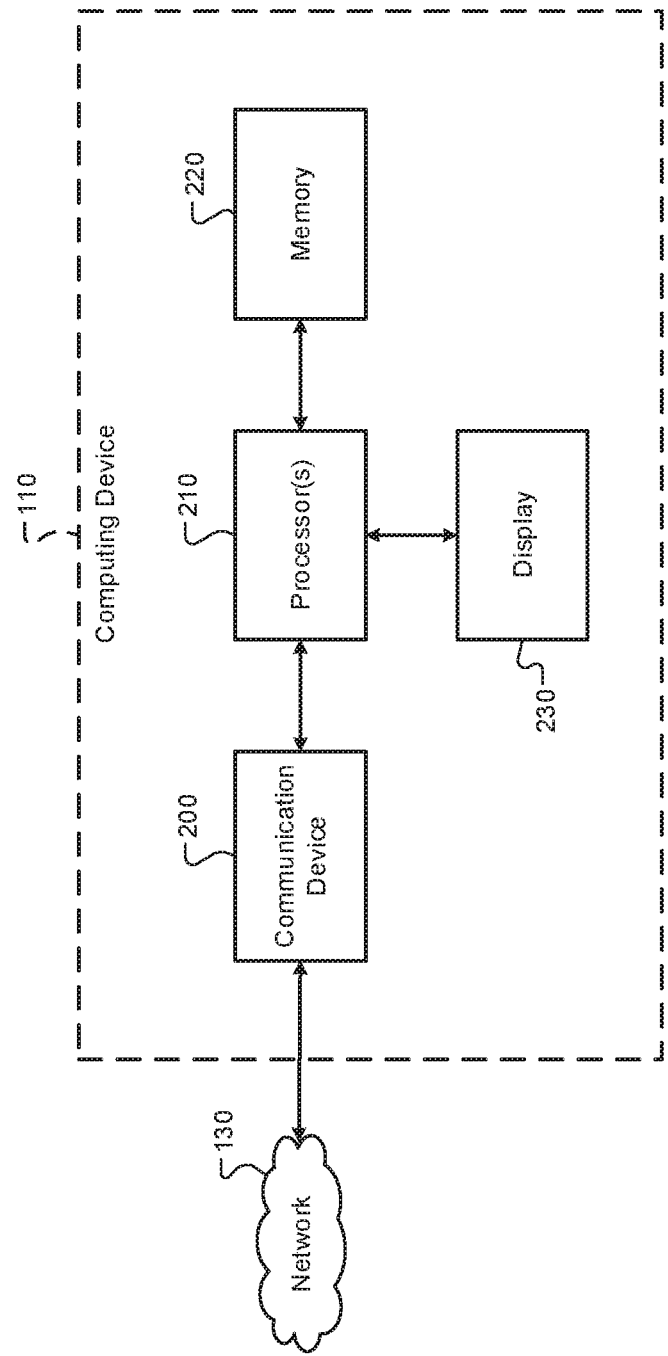
FIG. 2 is a functional block diagram of the example computing device of FIG. 1.

While illustrated as mobile phones ("smart" phones), each computing device 110 can be any type of suitable computing device, such as a desktop computer, a tablet computer, a laptop computer, a wearable computing device such as eyewear, a watch or other piece of jewelry, or clothing that incorporates a computing device. A functional block diagram of an example computing device 110 is illustrated in FIG. 2.

The computing device 110 can include a communication device 200, one more processors 210, a memory 220, and a display device 230. The processor(s) 210 can control operation of the computing device 110, including implementing at least a portion of the techniques of the present disclosure. The term "processor" as used herein is intended to refer to both a single processor and multiple processors operating together, e.g., in a parallel or distributed architecture.

The communication device 200 can be configured for communication with other devices (e.g., the server 120 or other computing devices 110) via the network 130. One non-limiting example of the communication device 200 is a transceiver, although other forms of hardware are within the scope of the present disclosure. The memory 220 can be any suitable storage medium (flash, hard disk, etc.) configured to store information. For example, the memory 220 may store a set of instructions that are executable by the processor 210, which cause the computing device 110 to perform operations, e.g., such as the operations of the present disclosure. The display device 230 can display information to the user 105. In some implementations, the display device 230 can comprise a touch-sensitive display device (such as a capacitive touchscreen and the like), although non-touch display devices are within the scope of the present disclosure.

It should be appreciated that the example server computing device 120 can include the same or similar components as the computing device 110, and thus can be configured to perform some or all of the techniques of the present disclosure, which are described more fully below.

With reference to FIGS. 3A to 3D, an example GUI 300 that can be displayed by the display device 230 of the example computing device 110 when executing an instant messaging application according to certain implementations of the present disclosure is shown. The illustrated GUI 300 includes an instant message display portion 302 and an instant message input portion 304. Instant messages that are sent or received can be displayed in the instant message display portion 302, and a user 105 can provide textual or other input in the instant message input portion 304, e.g., via a virtual keyboard (not shown) or other user input device.

A first received instant message 310 can be received by the computing device 110. In the illustrated example, the first received instant message 310 includes the text content "I was offered a new job!" (see, e.g., FIG. 3A) and is associated with a timestamp of "time t." The first received instant message 310 can be displayed in the instant message display portion 302. A user 105 associated with the computing device 110 can read or otherwise perceive the text content of the first received instant message 310 (e.g., by hearing an audio output representative of the text content via a text-to-speech functionality).

Figure 3A:
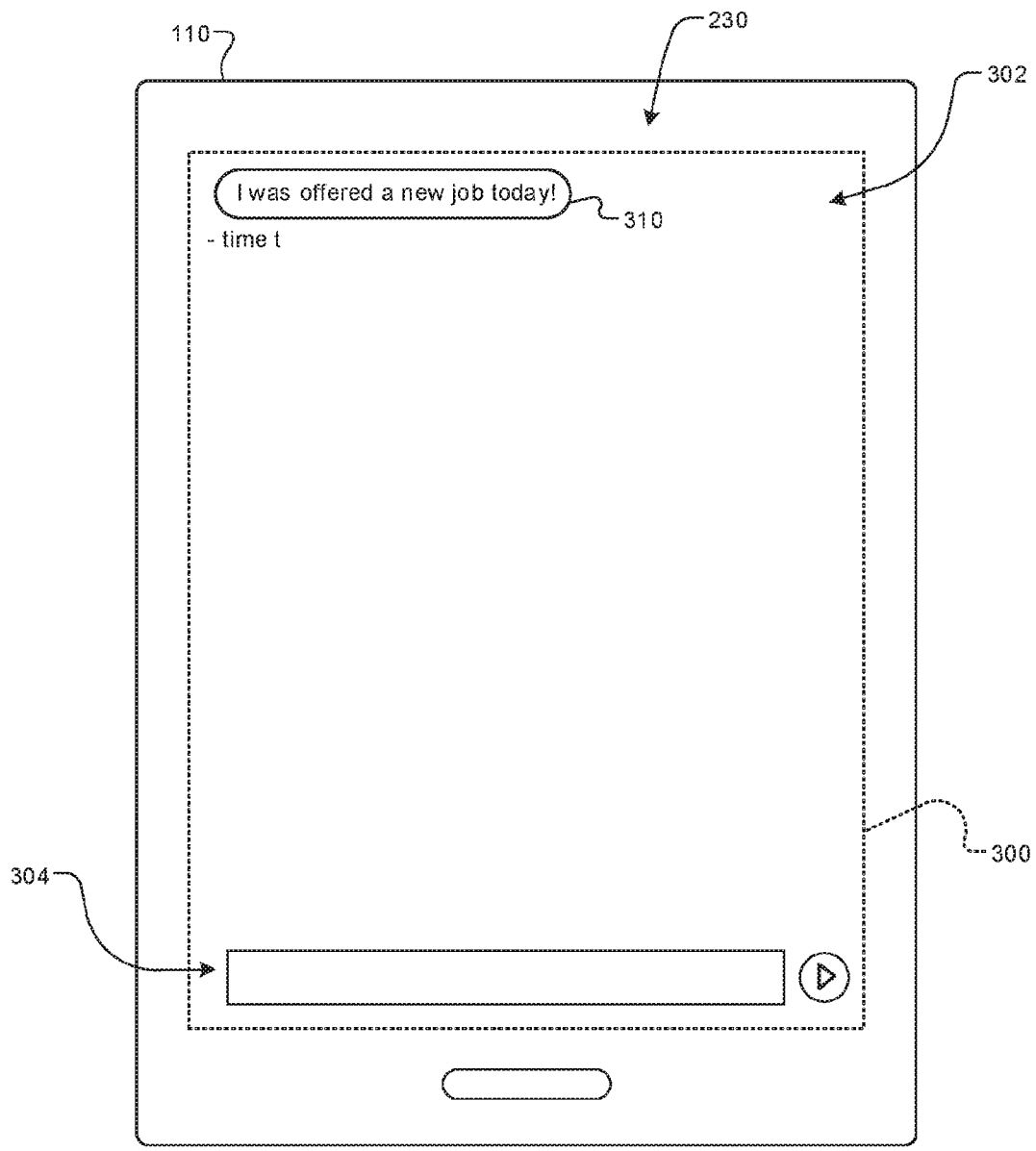
FIGS. 3A-3D are diagrams of example graphical user interfaces according to some implementations of the present disclosure.
Figure 3B:
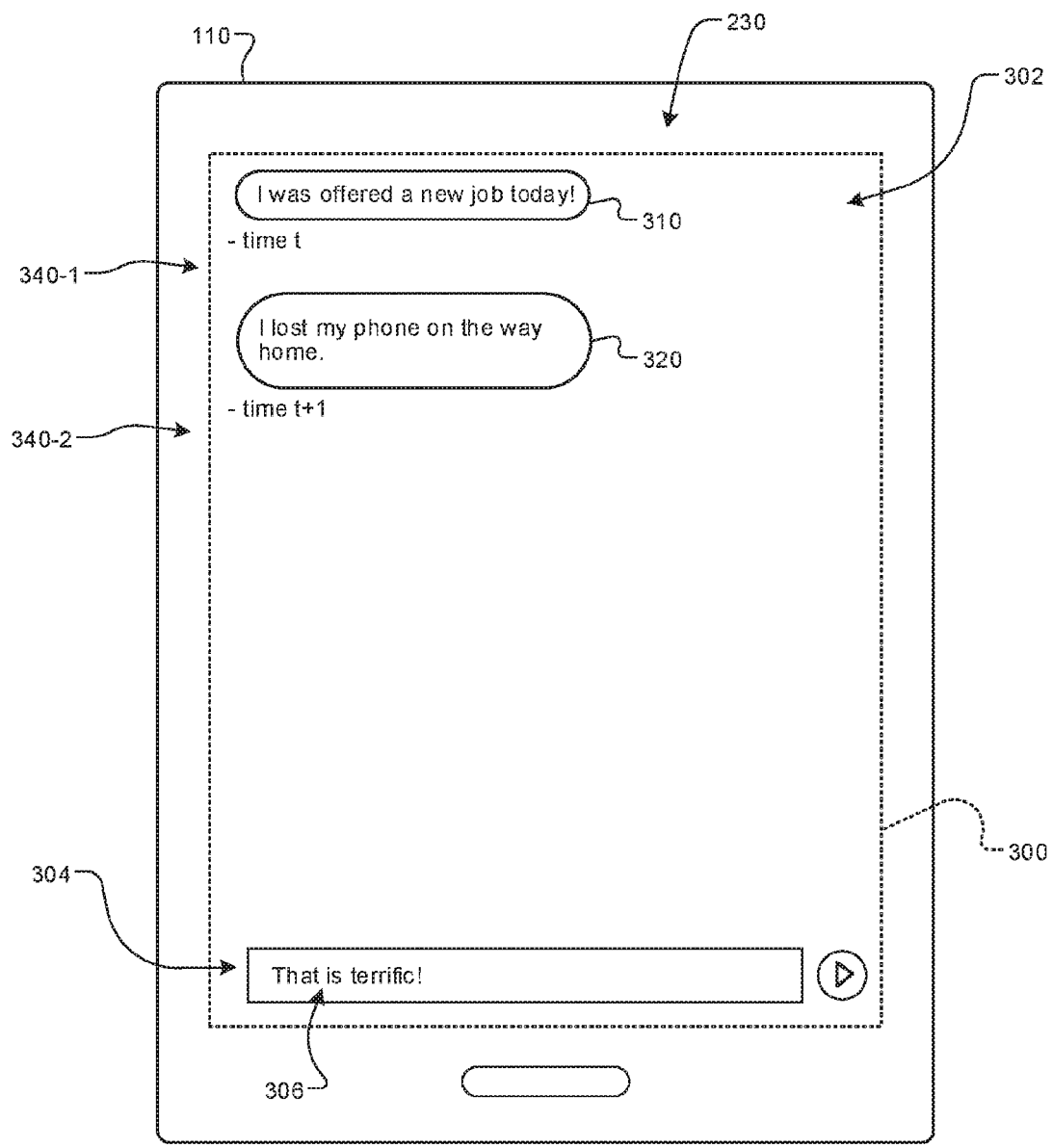

The user 105 can begin providing a user input 306 to the instant message input portion 304 that includes the text content ("That is terrific!") of an instant message in response to the first received instant message 310. As shown in FIG. 3B, the user input 306 has not yet been sent by the user 105/computing device 110, and thus does not appear in the instant message display portion 302 of the GUI 300. Before the user 105 has provided an input to transmit (or "send") the user input 306 as an instant message, the computing device 110 has received a second received instant message 320 that includes the text content "I lost my phone on the way home." with a timestamp of time "t+1," which is displayed in the instant message display portion 302.

Notwithstanding the second received instant message 320, the user 105 may still desire to transmit the user input 306 as an instant message 330 in response to the first received instant message 310. When the user input 306 is sent to the other user, the computing device 110 can determine an insertion point 340-1, 340-2, . . . 340-N (referred to herein collectively and individually as "insertion point(s) 340") for the instant message 330 that is most appropriate for the text content therein, as further described below.

Figure 3C:
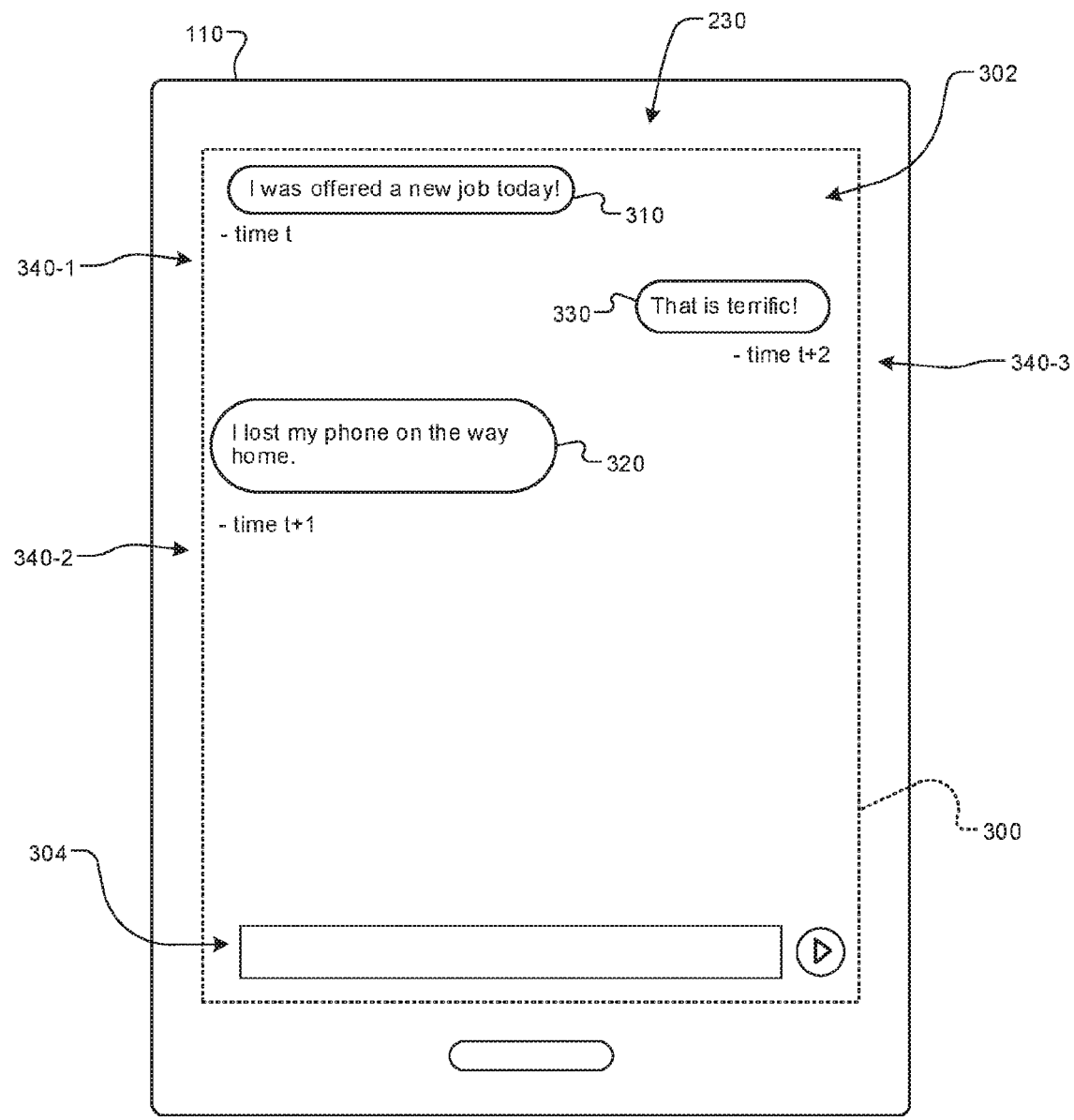
Figure 3D:
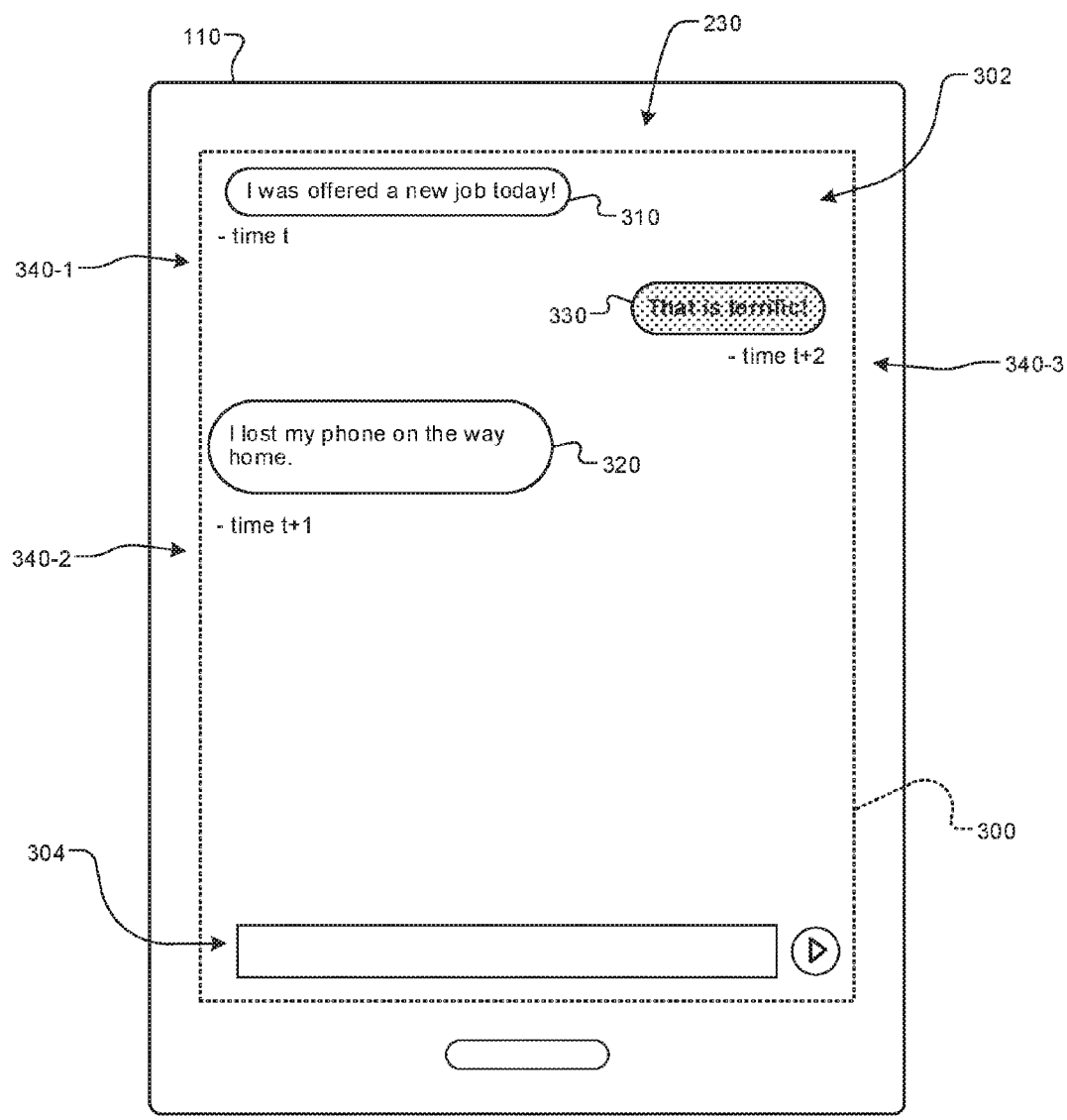

Each insertion point 340 can correspond to a particular location of a plurality of possible locations in the GUI 300, where each of the plurality of locations corresponds to a position in the GUI 300 following a preceding instant message. For example only, and as shown in FIGS. 3B and 3C, the insertion point 340-1 corresponds to the position in the GUI 300 following the preceding instant message "I was offered a new job!" 310, the insertion point 340-2 corresponds to the position in the GUI 300 following the preceding instant message "I lost my phone on the way home" 320, and the insertion point 340-3 corresponds to the position in the GUI 300 following the preceding instant message "That is terrific!" 330.

In some implementations of the present disclosure, the text content of a received instant message (such as the instant message 330) can be analyzed to determine a probability that the text content is associated with one or more preceding instant messages (such as, first and second instant messages 310 and 320). A probability for each preceding instant message can be obtained, e.g., by utilizing a language model to determine the likelihood that the received instant message 330 is in response to each preceding instant message, and/or looking at a time that a user begins typing the instant message in comparison to the publication times of one or more preceding instant messages.

A language model can be a probability distribution over a sequence of text (characters, word, phrases, etc.) that is derived from (or "trained" based on) training data. In some implementations, a language model can assign a probability to a piece of unknown text (character, word, phrase, etc.) based on the surrounding text (before and/or after the unknown text) and a corpus of training data upon which the language model is trained. The language model can be trained based on a corpus of ordered instant messages. In some implementations, the corpus of ordered instant messages has been manually ordered such that each instant message is associated with (or can be considered to be in response to) its particular preceding message. The use of such a labeled training corpus or set can be referred to as a supervised learning process.

In other implementations, the corpus of ordered instant messages comprises instant messages that have not been manually ordered or otherwise manipulated and are ordered only by the times associated with the instant messages (an "unlabeled" training corpus or set). Notwithstanding the fact that such unlabeled data may contain some inaccurate data (e.g., an instant message that is not in response to or otherwise associated with its preceding instant message), the amount of inaccurate data may be of an amount that it is not detrimental to (or has such a minor effect on) the language model that the learned language model is sufficient for its intended purpose. In yet further implementations, the language model can be trained based on a combination of labeled and unlabeled data.

Once the insertion point 340 for the received instant message 330 has been determined, the computing device 110 can display the received instant message 330 in the GUI 300 at the determined insertion point (which, in the present example, corresponds to the insertion point 340-1). With reference to FIG. 3C, the instant message 330 is shown in the GUI 300 following the first received instant message 310 and preceding the second received instant message 320. In this manner, the instant messages 310, 320, and 330 can be said to be re-ordered since these instant messages do not appear in the GUI 300 in a solely time-based order, as may be expected by a user 105 familiar with the typical ordering scheme.

It may be beneficial to provide an active indication to the user 105 that the instant message 330 has been inserted at the insertion point 340-1 rather than following the most recent instant message as the user 105 may expect. Accordingly, with specific reference to FIG. 3D, the computing device 110 can provide an active indication 335 that the instant message 330 has been inserted at the insertion point 340-1. For example only, if the instant message 330 is received at a first time, displaying the instant message 330 at the determined insertion point 340 can include providing an active indication 335 when the computing device 110 is displaying the GUI 300 at the first time and the determined insertion point 340-1 corresponds to a re-ordered position. A re-ordered position can, e.g., comprise any position in the GUI 300 other than a most recent instant message position (such as 340-2 in FIGS. 3B and 3C).

Conversely, when the computing device 110 is not displaying the GUI 300 at the first time and/or when the determined insertion point 340 does not correspond to a re-ordered position (that is, when the determined insertion point corresponds to the most recent instant message position 340-2), displaying the instant message 330 at the determined insertion point 340 can comprise not providing the active indication 335.

The active indication 335 can be any distinctive marking or visual distinguisher that differentiates the re-ordered instant message 330 from the other instant messages 310 and 320. Examples of an active indication 335 include, but are not limited to, modifying the text of the re-ordered instant message 330 (bold, italics, different color, etc.), modifying the appearance of the instant message 330 (shaded, flashing, blinking, different color or changing colors, etc.), moving the instant message 330 to indicate the insertion of the instant message 330 in the GUI 300, or a combination thereof. Other active indications 335 are within the scope of the present disclosure.

In further implementations, each instant message can include a timestamp that corresponds to a time that the instant message was initiated by its sender user 105s. In such cases, the determination of the insertion point 340 by the computing device 110 may be further based on the timestamp. For example only, the time difference between two instant messages (that is, the difference between the timestamps for two instant messages) can relate to the likelihood that the instant messages are associated with each other (one instant message is in response to the other instant message, etc.). A large time difference between the timestamps of two instant messages may indicate that the instant messages are less likely to be associated, and a small time difference between the timestamps of two instant messages may indicate that the instant messages are more likely to be associated.

The timestamps of instant messages can further be utilized, e.g., to exclude certain insertion points as candidate insertion points for a particular instant message. For example only, a timestamp for a particular instant message (e.g., instant message 330) that indicates that it was initiated—but not sent—prior to receiving a later instant message (e.g., instant message 320) can be utilized to eliminate the insertion point corresponding to the position following the later instant message (320). It can be presumed that the particular instant message 330 (or at least a portion or segment thereof) cannot logically be in response to an instant message (320) that was not yet received at the time the particular instant message 330 was initiated. As further described herein, in addition or alternatively the particular instant message (330) may be analyzed to determine whether to divide the instant message 330 into segments (e.g., semantically distinct segments). The division of the instant message 330 can further be based on the timestamps for the instant message 330 or segments thereof (e.g., the segment timestamps described below).

The time that an instant message was initiated by the sender user 105s as indicated by the timestamp can be determined in a number of manners. In some cases, the time that an instant message was initiated by the sender user 105s can comprise a begin typing time at which the sender user 105s began inputting the text content or providing the user input 306. If, however, the sender user 105s modifies the user input 306 by deleting a previously input portion of the text content (e.g., by deleting previously input words, phrases, or sentences), the time that an instant message was initiated by the sender user 105s can instead comprise a modification typing time at which the sender user 105s began inputting a portion of the text content after deleting a previously input portion of the text content. In some implementations, and as discussed more fully below, the time that an instant message was initiated by the sender user 105s can instead comprise a plurality of segment times corresponding to a plurality of segments of the instant message, respectively. In such instance, each of the plurality of segment times corresponds to the time that its corresponding segment was initiated.

In addition or alternatively to basing the determination of insertion points 340 on timestamps, the computing device 110 can analyze the locations following no more than a certain number of preceding instant messages as a potential insertion point 340 for the instant message 330. For example only, the computing device 110 can be limited to analyzing only the previous five instant messages when determining the insertion point 340 for the instant message 330.

As briefly mentioned above, rather than analyzing each instant message as a whole, in some implementations the computing device 110 can analyze the text content of each instant message to determine whether the text content includes two or more potentially semantically distinct segments. In such cases, each of the two or more potentially semantically distinct segments can be analyzed separately to determine its corresponding segment insertion point.

Referring now to FIGS. 4A-4D, an example GUI 400 that can be displayed by the display device 230 of the example computing device 110 when executing an instant messaging application according to certain implementations of the present disclosure is shown. The illustrated GUI 400 includes an instant message display portion 402 and an instant message input portion 404. Instant messages that are sent or received can be displayed in the instant message display portion 402, and a user 105 can provide textual or other input in the instant message input portion 404, e.g., via a virtual keyboard (not shown) or other user input device.

A first received instant message 410 can be received by the computing device 110. In the illustrated example, the first received instant message 410 includes the text content "I was offered a new job!" (see, e.g., FIG. 4A). The first received instant message 410 can be displayed in the instant message display portion 402. A user 105 associated with the computing device 110 can read or otherwise perceive the text content of the first received instant message 410 (e.g., by hearing an audio output representative of the text content via a text-to-speech functionality).

Figure 4A:
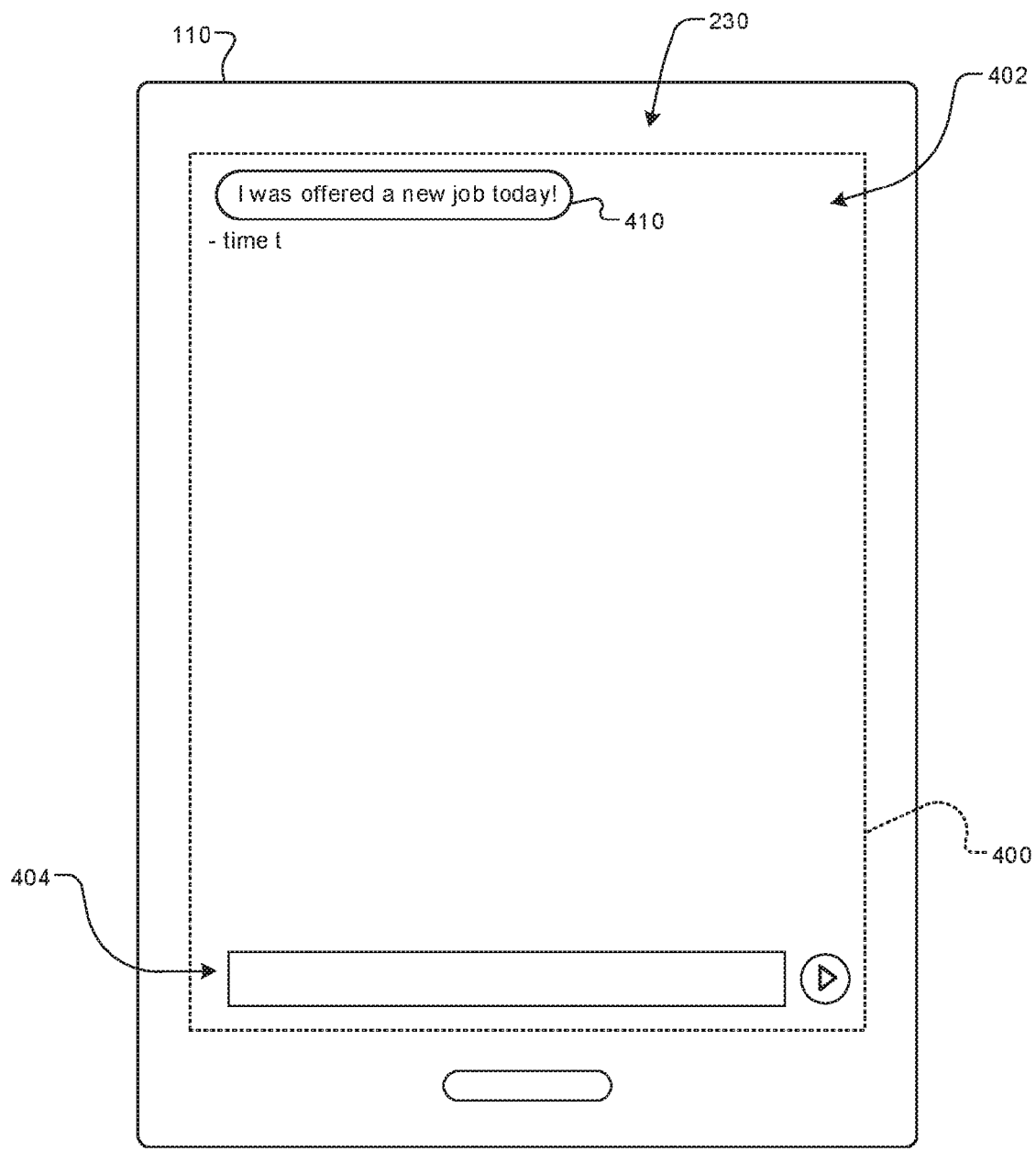
FIGS. 4A-4D are diagrams of example graphical user interfaces according to some implementations of the present disclosure.
Figure 4B:
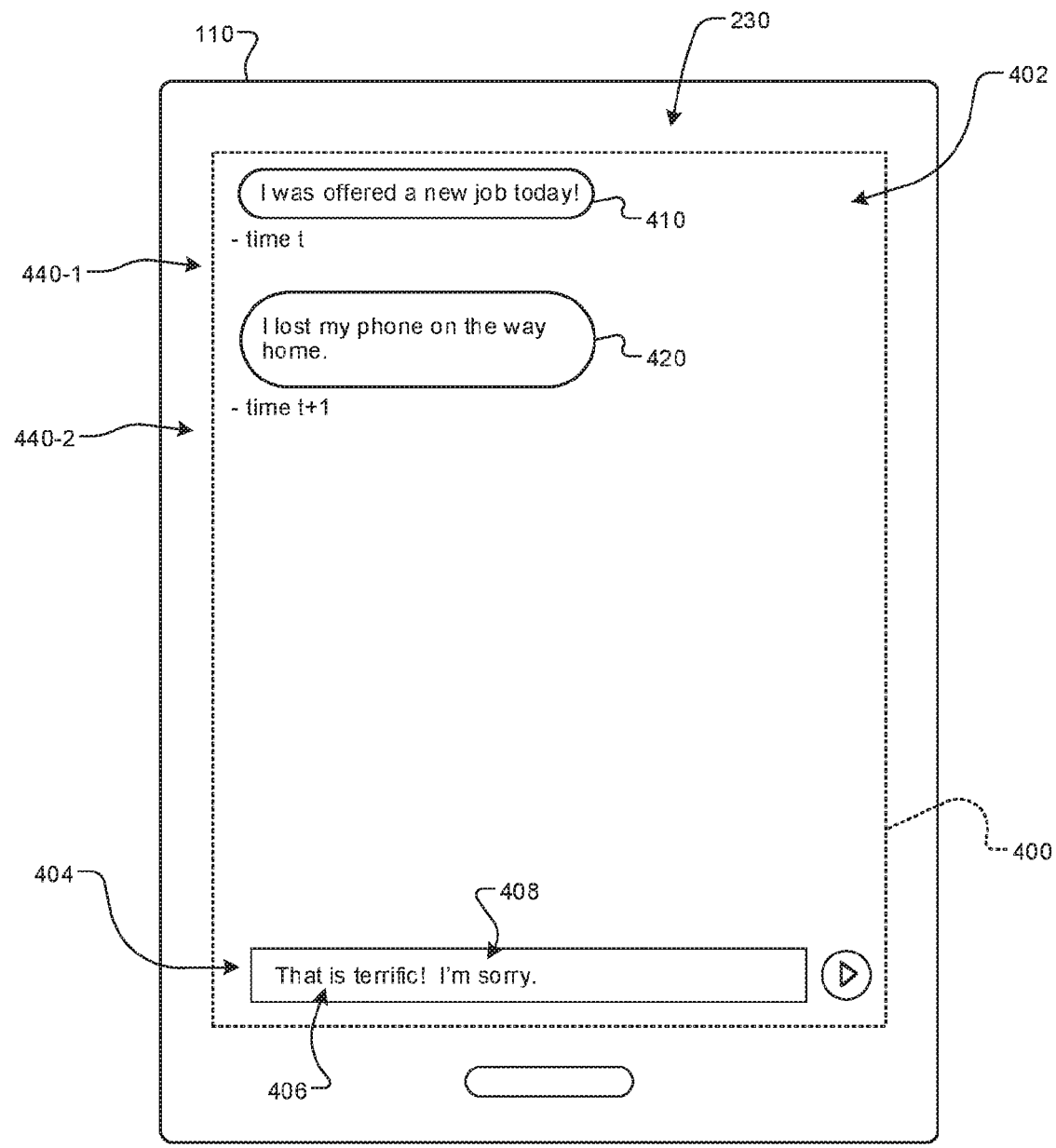

The user 105 can begin providing a user input 406 to the instant message input portion 404 that includes the text content ("That is terrific!") of an instant message in response to the first received instant message 410. As shown in FIG. 4B, the user input 406 has not yet been sent by the user 105/computing device 110, and thus does not appear in the instant message display portion 402 of the GUI 400. Before the user 105 has provided an input to transmit (or "send") the user input 406 as an instant message, the computing device 110 has received a second received instant message 420 that includes the text content "I lost my phone on the way home.", which is displayed in the instant message display portion 402.

In light of the second received instant message 420, the user 105 may wish to alter the user input 406 before transmitting the user input 406 as an instant message 430. As shown in FIG. 4B, the user 105 can modify the user input 406 ("That is terrific!") by adding the user input 408 "I'm sorry" and then send the combined text content as an instant message 430.

When the instant message 430 (comprising the combined user input 406 and 408) is sent to the other user, the computing device 110 can analyze the text content to determine whether the text content includes two or more potentially semantically distinct segments. When the instant message 430 is determined to include two or more potentially semantically distinct segments (such as, first segment 430-A and second segment 430-B), the computing device 110 can determine an insertion point 440-1, 440-2, . . . 440-N (referred to herein collectively and individually as "insertion point(s) 440") for the instant message 430 by determining, for each potentially semantically distinct segment 430-A and 430-B, a segment insertion point 440 based on the potentially semantically distinct segment.

Figure 4C:
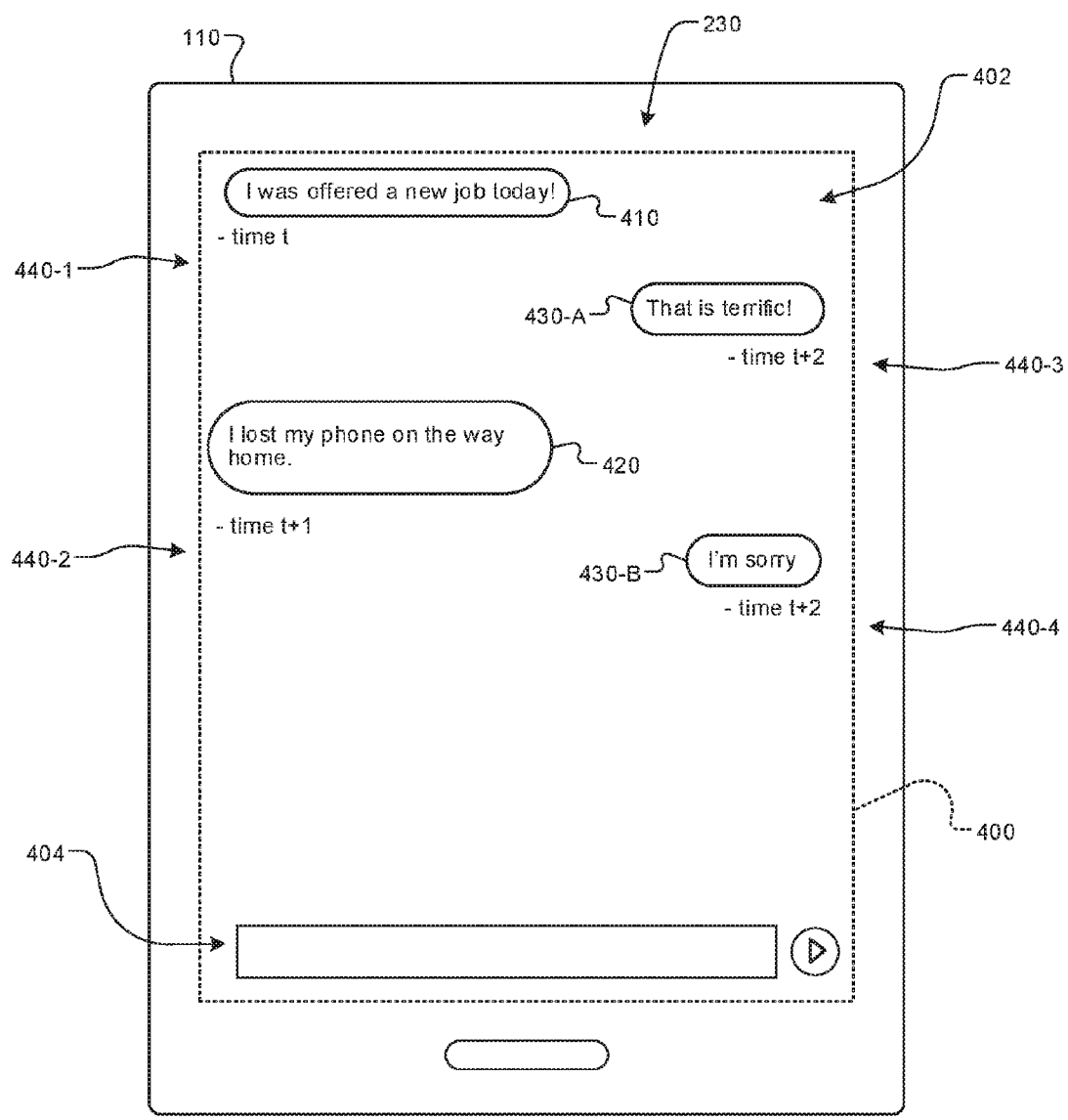
Figure 4D:
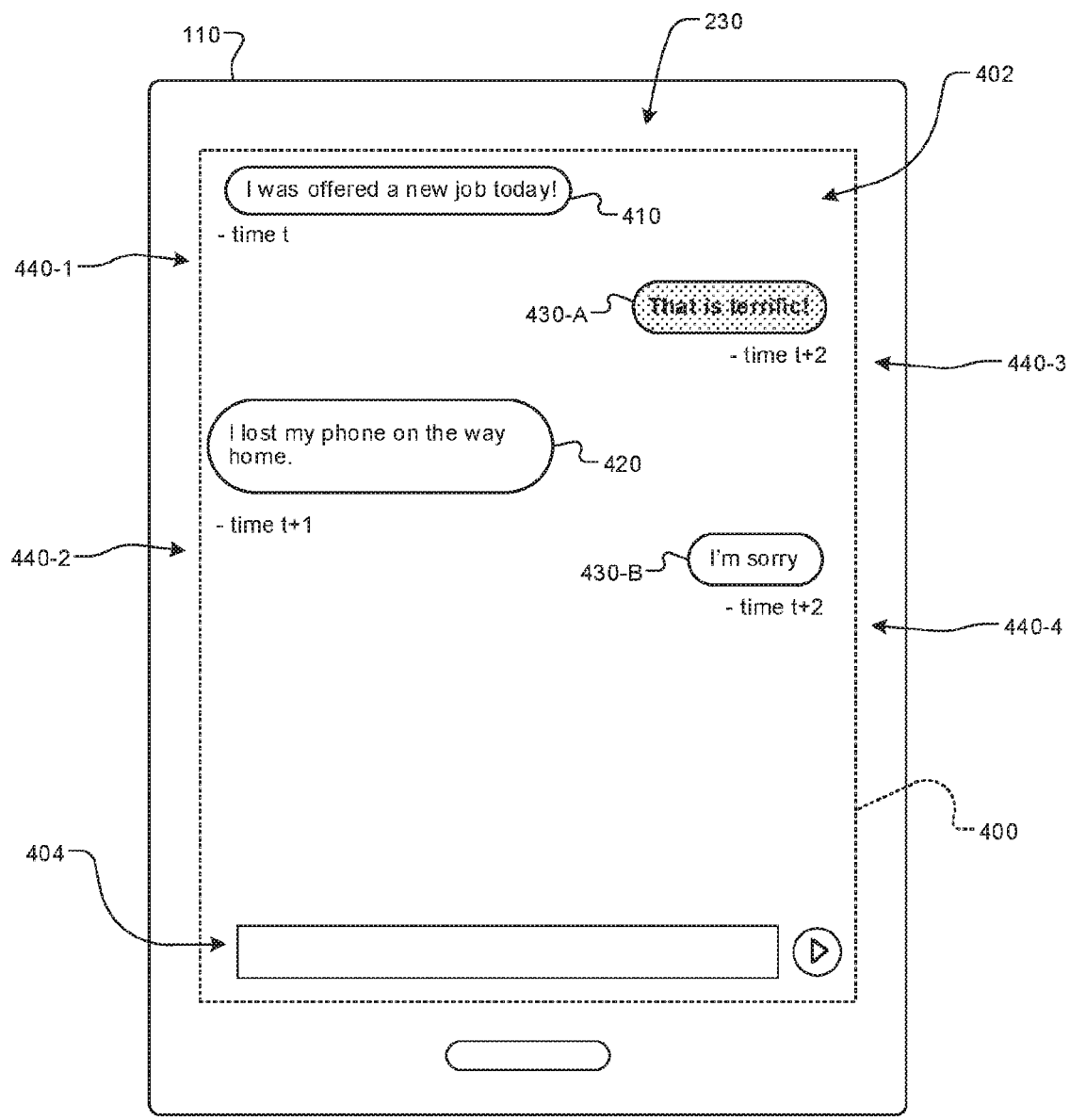

Similar to insertion points 340 discussed above, each insertion point 440 can correspond to a particular location of a plurality of possible locations in the GUI 400, where each of the plurality of locations corresponds to a position in the GUI 400 following a preceding instant message (or segment thereof). For example only, and as shown in FIGS. 4B and 4C, the insertion point 440-1 corresponds to the position in the GUI 400 following the preceding instant message "I was offered a new job!" 410, the insertion point 440-2 corresponds to the position in the GUI 400 following the preceding instant message "I lost my phone on the way home" 420, the insertion point 440-3 corresponds to the position in the GUI 400 following the preceding instant message segment "That is terrific!" 430-A, and the insertion point 440-4 corresponds to the position in the GUI 400 following the preceding instant message segment "I'm sorry." 430-B.

In some implementations of the present disclosure, the text content of a potentially semantically distinct segment (such as the segment 430-A) can be analyzed to determine a probability that the text content is associated with one or more preceding instant messages or segments (such as, first and second instant messages 410 and 420). A probability for each preceding instant message/segment can be obtained, e.g., by utilizing a language model, as described above.

Once the insertion point(s) 440 for each of the potentially semantically distinct segments 430-A and 430-B has been determined, the computing device 110 can display the received instant message segments 430-A and 430-B in the GUI 400 at the determined segment insertion point(s) 440 (which, in the present example, corresponds to the insertion point 440-1 for potentially semantically distinct segment 430-A and insertion point 440-2 for potentially semantically distinct segment 430-B). With reference to FIG. 4C, the instant message 430 is split into two instant message segments 430-A and 430-B, which are shown in the GUI 400 following the first received instant message 410 and following the second received instant message 420, respectively. In this manner, the instant messages/segments 410, 420, 430-A, and 430-B can be said to be re-ordered since these instant messages do not appear in the GUI 400 in a solely time-based order, as may be expected by a user 105.

In some implementations, analyzing the text content of the instant message 430 to determine whether the text content includes two or more potentially semantically distinct segments (430-A, 430-B) can include analyzing the text content to determine whether the text content includes one or more text split points. Text split points can include, but are not limited to, specific punctuations, characters, or words/phrases that can be indicative of semantic switching points. Examples of a text split point include, but are not limited to, a period, an exclamation point, or question mark, the word(s) "and" or phrase abbreviation "BTW" (standing for "by the way"), or even an empty space between characters.

When the text content includes one or more text split points, the computing device 110 can split the text content at the one or more text split points to obtain the two or more potentially semantically distinct portions 430-A and 430-B. In the illustrated example, a text split point may be the "!" after "terrific," which provides the potentially semantically distinct segments "This is terrific!" 430-A and "I'm sorry." 430-B. A segment insertion point 440 for each of the potentially semantically distinct segments 430-A, 430-B can then be determined, as described above.

In further implementations, each potentially semantically distinct segment 430-A and 430-B can include a timestamp that corresponds to a segment time that the potentially semantically distinct segment was initiated by its sender user 105s. In such cases, the determination of the segment insertion point 440 by the computing device 110 may be further based on the timestamp. For example only, the time difference between two instant messages/potentially semantically distinct segments (that is, the difference between the timestamps) can relate to the likelihood that the instant messages/potentially semantically distinct segments are associated with each other (one instant message or segment is in response to the other instant message or segment, etc.). A large time difference between the timestamps of two instant messages/potentially semantically distinct segments may indicate that the instant messages/segments are less likely to be associated, and a small time difference between the timestamps of two instant messages/potentially semantically distinct segments may indicate that the instant messages are more likely to be associated.

The segment time that a potentially semantically distinct segment was initiated by the sender user 105s as indicated by the timestamp can be determined in a number of manners. In some cases, the segment time that a potentially semantically distinct segment 430-A was initiated by the sender user 105s can comprise a begin typing time at which the sender user 105s began inputting the text content or providing the user input 406. If, however, the sender user 105s modifies the user input 406 by deleting a previously input portion of the text content (e.g., by deleting previously input words, phrases, or sentences), the segment time that a potentially semantically distinct segment 430-A was initiated by the sender user 105s can instead comprise a modification typing time at which the sender user 105s began inputting a portion of the text content 406 after deleting a previously input portion of the text content.

It may be beneficial to provide an active indication 435 to the user 105 that the potentially semantically distinct segment 430-A has been inserted at the insertion point 440-1 rather than following the most recent instant message as the user 105 may expect. Accordingly, with specific reference to FIG. 4D, the computing device 110 can provide an active indication 435 that the instant message 430-A has been inserted at the insertion point 440-1. For example only, if the potentially semantically distinct segment 430-A is received at a first time, displaying the potentially semantically distinct segment 430-A at the determined insertion point 440 can include providing an active indication 435 when the computing device 110 is displaying the GUI 400 at the first time and the determined insertion point 440-1 corresponds to a re-ordered position. A re-ordered position can, e.g., comprise any position in the GUI 400 other than a most recent instant message position (such as 440-2 in FIGS. 4B and 4C).

Conversely, when the computing device 110 is not displaying the GUI 400 at the first time and/or when the determined insertion point 440 does not correspond to a re-ordered position (that is, when the determined insertion point corresponds to the most recent instant message position 440-2), displaying the potentially semantically distinct segment 430-B at the determined insertion point 440-2 can comprise not providing the active indication 435.

As described above, the active indication 435 can be any distinctive marking or visual distinguisher that differentiates the re-ordered potentially semantically distinct segment 430-A from the other instant messages 410 and 420 and potentially semantically distinct segments (potentially semantically distinct segment 430-B). Examples of an active indication 435 include, but are not limited to, modifying the text of the re-ordered potentially semantically distinct segment 430-A (bold, italics, different color, etc.), modifying the appearance of the potentially semantically distinct segment 430-A (shaded, flashing, blinking, different color or changing colors, etc.), moving the potentially semantically distinct segment 430-A to indicate the insertion of potentially semantically distinct segment 430-A in the GUI 400, or a combination thereof. In the example illustrated in FIG. 4D, the text content of the potentially semantically distinct segment 430-A has been modified (bolded) and the appearance of the potentially semantically distinct segment 430-A has been modified (shaded). Other active indications 435 are within the scope of the present disclosure.

Figure 5:
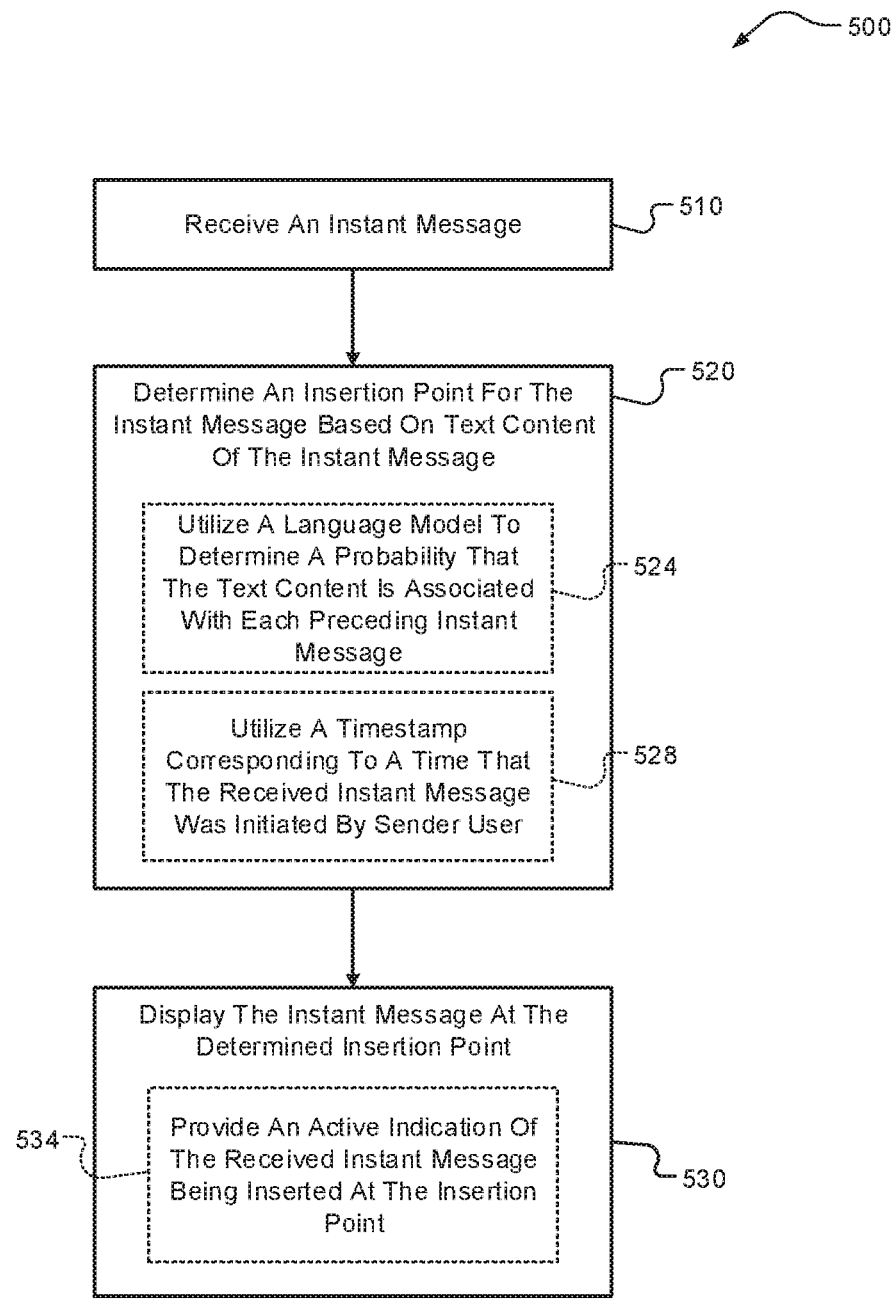
FIG. 5 is a flow diagram of an example technique for ordering textual messages based on text content according to some implementations of the present disclosure.

Referring now to FIG. 5, a flow diagram of an example technique 500 for ordering instant messages based on text content is illustrated. While the technique 500 will be described below as being performed by a computing device 110, it should be appreciated that the technique 500 can be performed, in whole or in part, at another or more than one computing device and/or the server 120 described above. Furthermore, the example technique 500 will be described in the context of receiving an instant message 330, 430. Notwithstanding the description of instant messages 330, 430, it should be appreciated that the techniques can also or alternatively be applied to potentially semantically distant segments 430-A, 430-B, as described above.

At 510, an instant message (such as instant message 330 or 430) is received by a computing device 110. An insertion point (insertion point 340 or 440) can be determined based on the text content of the received instant message (330, 430). In some implementations, determining an insertion point 340, 440 can be determined by utilizing a language model (524) to determine a probability that the text content of the instant message 330, 430 is associated with each preceding instant message (310, 320, 410, 420) as described above. Additionally or alternatively, and as discussed herein, determining an insertion point 340, 440 can be determined by utilizing a timestamp (528) corresponding to a time that the received instant message 330, 430 was initiated by a sender user 105s.

The technique can further include displaying the instant message (330, 430) at the determined insertion point (340, 440) of the GUI (300, 400) at 530. In some implementations, the displaying 530 of the instant message 330, 430 can include providing an active indication 335, 435 (at 534) of the received instant message 330, 430 being inserted at the determined insertion point 340, 440. For example only, an active indication 335, 435 can be provided when—if the instant message 330, 430 is received at a first time—the computing device 110 is displaying the GUI 300, 400 at the first time and the determined insertion point 340, 440 corresponds to a re-ordered position (any position in the GUI 300, 400 other than a most recent instant message position), as described above.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    receiving, at a computing device executing a communication application, a received textual message from a sender user, the received textual message including text content;
    determining, at the computing device, an insertion point for the received textual message based on the text content, the insertion point corresponding to a particular location of a plurality of possible locations in a graphical user interface of the communication application, each of the plurality of possible locations corresponding to a position in the graphical user interface subsequent to a preceding textual message; and
    displaying, at the computing device, the received textual message in the graphical user interface of the communication application at the determined insertion point, wherein:
        the received textual message is received by the computing device at a first time; and
        when (i) the computing device is displaying the graphical user interface at the first time, and (ii) the determined insertion point corresponds to a re-ordered position other than a most recent textual message position, the displaying the received textual message in the graphical user interface at the determined insertion point comprises providing an active indication of the received textual message being inserted at the insertion point.

2. The computer-implemented method of claim 1 wherein when at least one of: (i) the computing device is not displaying the graphical user interface at the first time, and (ii) the determined insertion point does not correspond to the re-ordered position: the displaying the received textual message in the graphical user interface at the determined insertion point comprises not providing the active indication.

3. The computer-implemented method of claim 1, wherein determining the insertion point for the received textual message based on the text content comprises:
    utilizing a language model to determine a probability that the text content is associated with each preceding textual message; and
    determining the insertion point based on the probability.

4. The computer-implemented method of claim 1, wherein:
    the received textual message includes a typing timestamp corresponding to a time that the received textual message was initiated by the sender user;
    determining the insertion point for the received textual message is further based on the typing timestamp.

5. The computer-implemented method of claim 4, wherein the time that the received textual message was initiated by the sender user comprises a begin typing time at which the sender user began inputting the text content.

6. The computer-implemented method of claim 4, wherein the time that the received textual message was initiated by the sender user comprises a modification typing time at which the sender user began inputting a portion of the text content after deleting a previously input portion of the text content.

7. The computer-implemented method of claim 1, wherein the active indication is a distinctive marking that that differentiates the received textual message from other textual messages in the graphical user interface.

8. A computer-implemented method, comprising:
    receiving, at a computing device executing a communication application, a received textual message from a sender user, the received textual message including text content;
    determining, at the computing device, an insertion point for the received textual message based on the text content, the insertion point corresponding to a particular location of a plurality of possible locations in a graphical user interface of the communication application, each of the plurality of possible locations corresponding to a position in the graphical user interface subsequent to a preceding textual message;

displaying, at the computing device, the received textual message in the graphical user interface of the communication application at the determined insertion point; and analyzing, at the computing device, the text content to determine whether the text content includes two or more potentially semantically distinct segments, wherein, when the text content includes two or more potentially semantically distinct segments:
the determining the insertion point for the received textual message comprises determining, for each particular potentially semantically distinct segment, a segment insertion point based on the particular potentially semantically distinct segment, and the displaying the received textual message in the graphical user interface of the communication application at the determined insertion point comprises displaying each particular potentially semantically distinct segment at its corresponding segment insertion point.

9. The computer-implemented method of claim 8, wherein analyzing the text content to determine whether the text content includes two or more potentially semantically distinct segments comprises:
analyzing the text content to determine whether the text content includes one or more text split points; and
when the text content includes one or more text split points, splitting the text content at the one or more text split points to obtain the two or more potentially semantically distinct segments.

10. The computer-implemented method of claim 9, wherein determining, for each particular potentially semantically distinct segment, the segment insertion point based on the particular potentially semantically distinct segment comprises:
utilizing a language model to determine a probability that the particular potentially semantically distinct segment is associated with each preceding textual message; and
determining the segment insertion point based on the probability.

11. A computing device, comprising:
one or more processors; and
a non-transitory computer-readable storage medium having a plurality of instructions stored thereon, which, when executed by the one or more processors, cause the one or more processors to perform operations comprising:
executing a communication application;
receiving a received textual message from a sender user, the received textual message including text content;
determining an insertion point for the received textual message based on the text content, the insertion point corresponding to a particular location of a plurality of possible locations in a graphical user interface of the communication application, each of the plurality of possible locations corresponding to a position in the graphical user interface subsequent to a preceding textual message; and
displaying the received textual message in the graphical user interface of the communication application at the determined insertion point,
wherein:
the received textual message is received by the computing device at a first time; and
when (i) the computing device is displaying the graphical user interface at the first time, and (ii) the determined insertion point corresponds to a re-ordered position other than a most recent textual message position, the displaying the received textual message in the graphical user interface at the determined insertion point comprises providing an active indication of the received textual message being inserted at the insertion point.

12. The computing device of claim 11, wherein when at least one of: (i) the computing device is not displaying the graphical user interface at the first time, and (ii) the determined insertion point does not correspond to the re-ordered position: the displaying the received textual message in the graphical user interface at the determined insertion point comprises not providing the active indication.

13. The computing device of claim 11, wherein determining the insertion point for the received textual message based on the text content comprises:
utilizing a language model to determine a probability that the text content is associated with each preceding textual message; and
determining the insertion point based on the probability.

14. The computing device of claim 11, wherein:
the received textual message includes a typing timestamp corresponding to a time that the received textual message was initiated by the sender user;
determining the insertion point for the received textual message is further based on the typing timestamp.

15. The computing device of claim 14, wherein the time that the received textual message was initiated by the sender user comprises a begin typing time at which the sender user began inputting the text content.

16. The computing device of claim 14, wherein the time that the received textual message was initiated by the sender user comprises a modification typing time at which the sender user began inputting a portion of the text content after deleting a previously input portion of the text content.

17. The computing device of claim 11, wherein the active indication is a distinctive marking that that differentiates the received textual message from other textual messages in the graphical user interface.

18. A computing device comprising:
one or more processors; and
a non-transitory computer-readable storage medium having a plurality of instructions stored thereon, which, when executed by the one or more processors, cause the one or more processors to perform operations comprising:
executing a communication application;
receiving a received textual message from a sender user, the received textual message including text content;
determining an insertion point for the received textual message based on the text content, the insertion point corresponding to a particular location of a plurality of possible locations in a graphical user interface of the communication application, each of the plurality of possible locations corresponding to a position in the graphical user interface subsequent to a preceding textual message;
displaying the received textual message in the graphical user interface of the communication application at the determined insertion point; and
analyzing, at the computing device, the text content to determine whether the text content includes two or more potentially semantically distinct segments,
wherein, when the text content includes two or more potentially semantically distinct segments:

the determining the insertion point for the received textual message comprises determining, for each particular potentially semantically distinct segment, a segment insertion point based on the particular potentially semantically distinct segment, and the displaying the received textual message in the graphical user interface of the communication application at the determined insertion point comprises displaying each particular potentially semantically distinct segment at its corresponding segment insertion point.

19. The computing device of claim 18, wherein analyzing the text content to determine whether the text content includes two or more potentially semantically distinct segments comprises:

analyzing the text content to determine whether the text content includes one or more text split points; and when the text content includes one or more text split points, splitting the text content at the one or more text split points to obtain the two or more potentially semantically distinct segments.

20. The computing device of claim 19, wherein determining, for each particular potentially semantically distinct segment, the segment insertion point based on the particular potentially semantically distinct segment comprises:

utilizing a language model to determine a probability that the particular potentially semantically distinct segment is associated with each preceding textual message; and determining the segment insertion point based on the probability.

* * * * *